United States Patent Office 3,637,571
Patented Jan. 25, 1972

3,637,571
PROCESS FOR PREPARING THERMOPLASTIC
RESIN-ADDITIVE COMPOSITIONS
Walter Polovina, Princeton, N.J., assignor to Rexall Drug
and Chemical Company, Los Angeles, Calif.
No Drawing. Filed Apr. 15, 1968, Ser. No. 721,209
Int. Cl. C08f 45/04; C08g 51/04, 53/04
U.S. Cl. 260—34.2 R
5 Claims

ABSTRACT OF THE DISCLOSURE

The process comprises preparing a liquid formulation of solid additives such as pigments dissolved or dispersed in a suitable media such as water or aliphatic hydrocarbons, removing all the agglomerates and combining the resulting formulation with a thermoplastic resin. The resulting mixture is then dried and can be either extruded or milled and reduced into pellets or chips of resin-additive compositions or concentrates. The concentrates are blended with the respective base resins to achieve the desired modifications of the physical and chemical properties of the base.

BACKGROUND OF INVENTION

(1) Field of invention

This invention relates to a process for incorporating one or more additives into the matrix of a thermoplastic resin. More particularly, it relates to a process for preparing a liquid additive formulation, combining the liquid formulation with a thermoplastic resin and forming a thermoplastic resin-additive composition.

Additives are incorporated into thermoplastic resins to greatly modify their physical and chemical properties. The additives can be added directly to the resin or they can be added in the form of resin-additive concentrates. Such concentrates have found wide acceptance in the plastics industry to rapidly and uniformly blend additives into the base polymer. The most common examples of such additives include anti-static agents, anti-slip agents, stabilizers against heat and ultraviolet light degradation and pigments. The process of this invention finds particular application in providing resin-additive concentrates which are then blended with the base polymer and extruded into multifilment and very fine denier monofilament fibers as well as very fine polymer films, i.e., films of about 1 to 5 mils in thickness. The fibers find particular end-product applications in carpeting and fabrics of all types. The films are used in food packaging, sand bags, dry-cleaning bags and the like.

(2) Description of the prior art

Various prior art methods are employed to disperse additives in the matrix of a thermoplastic resin. The most common prior art methods involve mixing or grinding the dry additives into the powdered resin either to incorporate the desired amount of additives to produce the finished polymer or to incorporate a relatively large amount of the additives to obtain the resin-additive concentrates. A serious problem in such prior art methods is the tendency of the additives, which are in the form of finely divided materials, to agglomerate into large clusters which cause grave problems in subsequent processing.

Another method for dispersing additives in the resin matrix is by milling additives into the molten polymer in a Banbury mixer or 2-roll mill. Polymers such as polyolefins do not properly wet the dry, finely divided additives and do not develop suitable shearing rates during the grinding operation because of their low melt viscosities. Therefore, it is very difficult to reduce the additive clusters or aggregates to a size small enough to prevent the molten resin from plugging the screens placed immediately before the dies during extrusion and from causing a prohibitive pressure build-up across the screens. These problems and the problem of breaking of the extruded strands is especially prevalent in the extrusion of pigmented fibers of monofilament and multifilment fibers.

One prior art method for dealing with the foregoing problems is disclosed in British Pat. No. 991,584. The prior art comprises dispersing pigment additives into an aqueous phase with a water-soluble salt of a cationic surfactant and mixing in a low molecular weight polyolefin dissolved in a hydrocarbon solvent. The process requires the critical step of converting the additives from the aqueous phase to the hydrocarbon phase. This is done by adding, for example, sodium hydroxide, which converts the water-soluble salt to a polyolefin-soluble, water-insoluble free base. A powdered high molecular weight polyolefin can then be added and the entire mixture is dried and extruded to yield the pigment dispersion in a mixture of low an high molecular weight polyolefins. Such a complex method for solving the problem of uniformly dispersing additives in a polymer matrix introduces many problems of its own. It is axiomatic that if one increases the number of steps and the number of compounds to be incorporated in each step, the problems of the entire process increase.

SUMMARY OF THE INVENTION

In contrast to these prior art processes, the present invention is directed to a process for incorporating additives into the matrix of a thermoplastic resin with the elimination of agglomerates. The additives of this invention are uniformly dispersed in the resin matrix without the use of the complex two-phase technique of the prior art method which requires a conversion of additives from one phase to another. The resulting compositions of this invention can be extruded into multifilament fibers with almost no pressure build-up and without breakage of the extruded strands.

Therefore, it is an object of the present invention to provide a simple and efficient process for preparing a thermoplastic resin containing additives uniformly dispersed throughout the resin matrix.

It is another object of this invention to provide a process for preparing concentrates of a pigment additive uniformly dispersed in a thermoplastic resin matrix which can be blended with the base resin and extruded into fine denier fibers without the problems caused by agglomeration.

It is still another object of the present invention to provide a process in which the pigments are dispersed in the matrix of the thermoplastic resin to a greater extent than in the prior art processes.

In accordance with this invention, there is provided a process for incorporating additives into a thermoplastic resin matrix which comprises preparing a liquid formulation from either a solution of additives dissolved in a diluent or a liquid dispersion of additives dispersed in a diluent with a surface active agent. The liquid formulation is combined with a thermoplastic resin in a mixing zone with continuous agitation. The resulting mixture is then heated at conditions sufficient to drive off the majority of the diluent. After the diluent is removed, the resulting dried additive-coated thermoplastic resin is subjected to a high shear step. The product recovered from the shearing step is a thermoplastic resin-additive composition containing from about 1 to 80 weight percent additives. Products containing about 1 to 10 weight percent additives are employed directly as the finished polymer. Products containing about 10 to 80 weight percent and preferably about 20 to 75 weight percent additives are employed as thermoplastic resin-additive concentrates.

PREFERRED EMBODIMENTS OF THE INVENTION

The thermoplastic resins employed in the process of this invention can be any of the plastic molding materials such as polyethylene; polypropylene; polymers of alpha-olefins having 4 to 8 carbon atoms such as butene-1, pentene-1 and hexene-1; polyvinyl chloride and other vinyl polymers; polymethyl methacrylate and other acrylic resins; acrylonitrile-butadiene-styrene (ABS) polymers; copolymers of these substances and the like, as well as blends of these substances.

The thermoplastic resin employed in the process of this invention is preferably in powdered form. The average particle size, i.e., the mean diameter of a hypothetical particle of a size such that one-half is smaller and one-half is larger in particle size than the hypothetical particle, of the thermoplastic resin is in the range of about 20 to 200 mesh and even lower. Preferably the powder has an average particle size of no greater than 100 mesh. The smaller particles are generally preferred because the surface area exposed to the liquid formulation increases as the particle size decreases.

The additives employed in the process of this invention can include anti-static agents, ultraviolet stabilizers, heat stabilizers, antioxidants, slip agents, anti-block agents, plasticizers, delustrants, flame retardants, fillers, pigments and the like. The additives are employed in this process as finely divided solids, i.e., in the form of powder or flakes. The pigments or colorants, in particular, can be either in the form of a pulp or water-wet presscake or in the form of a dry powder or dust. The individual pigment particles making up the presscake are in their smallest size and do not agglomerate into clumps after the diluent is added.

The filler or extender additives, which are often considered under the same class as pigments, include for example alumina, calcium carbonate, silica, diatomaceous earth, clays and the like.

Both the organic and inorganic pigments can be used in the process of this invention. The preferred organic pigments are selected from the azo, anthraquinone and phthalocyanine series. Examples of the organic pigments include phthalocyanine blue, phthalocyanine green, naphthol scarlet (diazotized 2-methyl-5-nitroaniline coupled to naphthol AS), toluidine red toner (diazotized m-nitro-p-toluidine coupled to beta-naphthol), Hansa yellow (diazotized 4-amino-2-nitrotoluene coupled to acetoacetanilide), Pigment Green B (a nitroso beta-naphthol iron complex), rubine reds, benzidine yellows, lithols, benzidine oranges, carbazole violet, and the like and mixtures of these pigments. Examples of the inorganic pigments include titanium dioxide, iron blue, ultra-marine blue, chrome yellow, cadmium sulfide and carbon black and mixtures thereof. Reference can be made to Modern Plastics Encyclopedia Issue for 1968 published by McGraw-Hill, Inc., pages 496 through 498 for a more complete list of colorants and an indication of the most suitable colorants for a given resin.

The diluent employed in the liquid additive formulation of this process can be either a solvent for the additives or simply a carrier medium for the additives dispersed by means of the surface active agent. Any solvent can be used which does not act as a solvent for the particular thermoplastic resin employed. Solvents which cause the resin to soften or to become tacky are undesirable. This is true because the individual particles of the resin in the resulting mixture of the resin and the liquid formulation would tend to agglomerate into large clumps. Examples of the diluents of this process include water, aliphatic hydrocarbons having 1 to about 8 carbon atoms, mineral spirits, petroleum ether, kerosene, acetone, methyl ethyl ketone, methyl propyl ketone, methyl isopropyl ketone, methyl isobutyl ketone, acetate esters having 4 to about 8 carbon atoms, alcohols having 1 to about 8 carbon atoms, benzene, xylenes, toluene, ethylbenzene, trichloroethylene, tetrachloroethylene and the like and blends of these diluents. Reference can be made to Modern Plastics Encyclopedia for 1968, published by McGraw-Hill, Inc., pages 494 and 495 for a more complete list of diluents and the solubilities of various resins in selected diluents.

In general, it is preferred to use water as the diluent during the incorporation of the additives into the matrices of polyvinyl chloride, polystyrene, ABS polymers, and other styrenic polymers and their copolymers. When water is employed, it is preferred that the pigment additives are in the form of a water-wet presscake. This is true since the pigment in this form is more uniformly and rapidly dispersed into the liquid dispersion.

Cationic, non-ionic, anionic dispersing or surface active agents or a combination of such surface active agents can be used in preparing the liquid dispersion of the present invention.

Examples of suitable cationic surface active agents include tertiary amines, and more particularly, heterocyclic tertiary amines such as alkyl substituted imidazoline and oxazoline. Other substituted tertiary amines which can be used include the polyethyloxylated amines having the following formula:

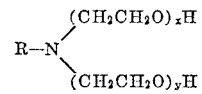

where R is an organic radical, i.e., a fatty acid radical containing from about 12 to about 20 carbon atoms and where $x$ and $y$ are integers whose sum ranges from 2 to about 7.

Examples of non-ionic and anionic surface active agents include alkyl aryl polyethyl alcohol and alkyl aryl sulfonates, respectively. The non-ionic agents can be prepared by condensing ethylene oxide with an alkyl phenol containing from about 4 to about 12 carbon atoms in the alkyl group. The anionic agents include the mixed isopropyl naphthalene sulfonates which may be used in the form of ammonium or alkali metal salts. A list of commercial anionic and non-ionic surface active agents can be found at columns 3 and 4, respectively, of U.S. Pat. 3,067,053.

In a more specific embodiment of the present invention, a liquid dispersion of pigment additives, a dispersing agent and a diluent is prepared in a dispersing zone and the resulting liquid dispersion is filtered or treated to remove pigment agglomerates from the dispersion. The liquid dispersion is sprayed onto a powdered thermoplastic resin with continuous agitation of the resin in a mixing zone. The agitation is continued for a period of at least 15 minutes after the powdered thermoplastic has been thoroughly coated with the dispersion. The coated resin is then gradually heated while continuing the agitation at conditions sufficient to reduce the content of diluent and other volatiles of the resin to less than about 4 percent based on the weight of the resin.

Commercially available equipment can be used to carry out each of the steps of the process of this invention. The additive solution can be prepared by dissolving one or more additives in the diluent or solvent of the type enumerated above in any agitated vessel well known in the art. The dispersing zone for preparing the liquid dispersion comprises, for example, high intensive mixing equipment such as a ball mill, pebble mill, sand mill, sand-grinder, colloid mill, stone mill and the like. However, any mixing equipment well known in the art can be used to obtain a homogeneous liquid dispersion or uniform distribution of the additive, dispersing agent and diluent under uniform wetting of such materials in the liquid system.

Any suitable means such as filtering or centrifuging can be used to remove the undissolved or undispersed particles and agglomerates from the liquid formulation. It is important that all of the agglomerates greater than about 40 microns are removed from the liquid formulation. Specific examples of particularly useful commercially available equipment for removing such material include Cuno filters manufactured by the The Cuno Engineering Corporation, a subsidiary of American Machine and Foundry Company, and Vorti-Siv sieving and screening machines manufactured by Lehmann, a Division of Mullins Manufacturing Corporation.

Although the mixing zone can comprise any of several types of high intensity or shear mixers in which the dry polymer powder is added to the vigorously agitated liquid formulation, the preferred mixing zone comprises a device for imparting a tumbling action to the powdered thermoplastic resin. The preferred device contains a liquid conduit having nozzle means for uniformly discharging the liquid formulation in the form of a fine spray onto the constantly changing surface of the powdered thermoplastic resin as it tumbles. It is important to uniformly distribute the liquid formulation over the surface of the resin without any accumulation of excessive liquid on the surface so that the resin remains free-flowing during the coating and subsequent drying steps. Means are provided to place the device under vacuum to remove volatile materials. The device is also provided with a steam jacket or other means to heat the mixture within the device to aid in the removal of the diluent. After the liquid dispersion has been sprayed onto the thermoplastic resin, the coated resin is tumbled further for a period of at least 15 additional minutes, and more particularly, for a period of 20 to 40 minutes after which the device is placed under a reduced pressure and at an elevated temperature to volatilize the diluent and other volatiles from the coated thermoplastic resin. The resulting dried, coated thermoplastic resin should contain no more than 4 weight percent volatiles and preferably less than 1 weight percent based on the weight on the resin.

If the additive-resin composition is prepared by dispersing the resin powder in a solution of additives, the additives cover the entire surface of the dried resin with what is believed to be a monomolecular layer which adheres strongly to the surface of the powder. This is the case because of the electrostatic forces between the additives and the powder. If the composition is prepared by dispersing the powder in a liquid dispersion of additives, the additives cover the entire surface of the dried resin with one or more layers of discrete particles. In the latter case, it is desirable that the additive-coated resin be dropped immediately from the mixing zone into a high shear device to prevent the excess layers of additives from being removed from the surface of the powder.

The high shear device can be a 2-roll mill or an extruder. The product from the high shear device is reduced in size to discrete particles in any conventional manner. The product from the 2-roll mill is in the form of a continuous sheet or band of thermoplastic resin-additive concentrate and can be broken up into chips or other discrete particles. The product from the extruder is subsequently pelletized in a conventional cutter. The size of the finished product depends on its use. For example, if the finished product is used as an additive concentrate and blended with base polymer in the form of 1/16 to 1/4-inch pellets, the chips or pellets of concentrate are in this size range. In general, the additive concentrate is blended with the same type of polymer that is used to prepare the concentrate.

The following examples illustrating the process of the present invention are included below:

EXAMPLE 1

The following components were placed in a Cowles dissolver manufactured by Morehouse-Cowles, Inc.: 65 pounds of $TiO_2$ pigment, 30 pounds of mineral spirits, 1 pound of a low molecular weight polyethylene sold under the trademark "AC–1701" by Allied Chemical Company and 4 pounds of a solution consisting of 25% of an anionic dispersion agent, sold under the trademark "Aerosol OT" by American Cyanamid, dissolved in toluene. The components were thoroughly mixed for a period sufficient to obtain a homogeneous premix, i.e., for about 30 minutes. An additional 10 pounds of mineral spirits were added to dilute the premix and the diluted premix was mixed for 15 minutes. The diluted premix was then pumped through a sand mill. The final composition of the liquid dispersion which was passed through the sand mill comprised:

| Components: | Parts by weight |
| --- | --- |
| $TiO_2$ | 65 |
| Aerosol OT | 1 |
| AC–1701 | 1 |
| Mineral spirits | 40 |
| Toluene | 3 |
| | 110 |

The liquid dispersion was then filtered through a 50 micron Cuno filter. The filtered disperson had a grind of at least 7 on a Hegman N.S. (North Standard) gauge used to measure the size of the largest particles in a given dispersion. A 7 on the Hegman scale corresponds to about 0.5 mil for the diameter of the largest particles (see ASTM D–1210–64 for the procedure). Sixty-five pounds polypropylene powder were added to a Rota-Cone combination blender and vacuum dryer manufactured by Paul O. Abbé Inc. Other blender-vacuum dryer combinations that can be employed in place of the Rota-Cone include those manufactured by Stokes Equipment Division of Pennsalt Chemicals Corporation and by J. P. Devine Manufacturing Company. The polypropylene powder was recovered from a slurry polymerization process (see U.S. Pat. 3,225,021), had a melt flow rate at 230° C. of about 10 to 25 gms./10 minutes (ASTM D–1238) and had an average particle size in the range from about 40 to 200 mesh. It is preferable to use polymers of high melt flow rate, i.e., above 5 and more preferably above 10 gms./10 minutes. The subsequent working of the pigment into the polymer is very difficult as polymer melt flow rates below 5 gms./10 minutes.

One hundred pounds of the filtered liquid dispersion was then sprayed onto the polypropylene powder while the powder was being tumbled in the Rota-Cone. After a period of about one hour, the temperature in the Rota-Cone was gradually increased to 200° F. and a vacuum of 15 to 30 inches was gradually applied over a period of 1½ hours to dry the coated powder to less than 1 percent residual volatile matter. The dry coated powder was then banded in a 2-roll mill, heated to 235° to 350° F. for 30 cuts, removed, cooled and chipped into discrete particles of 1/8 to 1/4-inch size.

The finished polypropylene-white pigment concentrate containing about 49 weight percent pigment was let down with commercially available polypropylene pellets sold under the trademark El Rexane 51 H–3 Rexall Chemical Company having a melt flow rate at 230° C. in the range of 3.2–3.8 gms./10 minutes (as measured by ASTM D–1238) and a heptane insolubility in the range of 94–96 percent (as by the Bailey Walker procedure). The resulting let down resin containing 2 weight percent concentrate was subjected to an extruder screen test. In this particular test, 8.5 pounds of the let down resin was placed in the hopper of a 1" extruder manufactured by National Rubber Machine Corporation, Model 50–17V–1 and was fed to the extruder at a screw speed of 100 r.p.m. and a variable drive setting of 7.9 and at an initial temperature of 480° F. with gradual adjustment to the melt temperature of 500° F. A pressure gauge is attached to the barrel of the extruder to indicate the back-up pressure behind a screen pack holder. The screen pack holder is designed to force the molten polymer to follow a path from the extruder screw through a ¼" diameter opening, then through a screen pack comprising two-325 mesh screens to take out gels and agglomerates and three-50 mesh screens to lend support to the screen pack and finally through a second ¼" diameter opening. The pressure rise for the let down resin was recorded at fixed intervals until the entire 8.5 pounds of resin had been extruded. The results are expressed as the percent pressure rise which equals:

$$\frac{\text{maximum pressure rise} - \text{pressure rise after 15 minutes of extrusion}}{\text{pressure rise after 15 minutes of extrusion}} \times 100$$

The results of the extruder screen test are a function of the amount of agglomerates and other contaminants present in the sample tested. Thus, the percent pressure rise is due to the plugging caused by the agglomerates contained in the base resin plus the agglomerates contained in the concentrate. The results set forth in Table I below are the percent pressure rises after 4 pounds and 7 pounds of the let down resin of Example 1 were extruded. Table I also includes the percent pressure rises for Control A which contains the same base resin let down with the same amount of a commercially available polypropylene-white pigment concentrate. This commercial concentrate was prepared in accordance with the process of British Patent No. 991,584 discussed under "Description of the Prior Art" and is recognized in the polymer industry for its use in fine denier multifilament fibers because of its fine degree of pigment dispersion.

TABLE I

| | Percent pressure rise | |
|---|---|---|
| | After 4 Lbs. | After 7 Lbs. |
| Example 1 | 10 | 30 |
| Control A | 50 | 100 |

The base polypropylene resin has an average percent pressure rise in the range of 7–14 after 7 pounds of resin has been extruded. Therefore, ¼–½ of the percent pressure rise of the Example 1 sample was due to the agglomerates and other contaminants in the base resin.

EXAMPLE 2

The same general procedure used in Example 1 was followed in Example 2 to prepare a polypropylene-black pigment concentrate except that a liquid dispersion was prepared in a steel ball mill in place of the sand mill. The liquid dispersion had the following composition:

| Components: | Parts by weight |
|---|---|
| EPC Black [1] | 24 |
| Amine #220 [2] | 1 |
| Lactol spirits [3] | 70 |
| Aerosol OT | 1 |
| Toluene | 4 |
| | 100 |

[1] Easy Processing Channel Black pigment sold by United Carbon Company.
[2] An amine having a M.W. of about 350 and a boiling point of 235° C. at 1 mm. Hg Sold by Union Carbide Corporation.
[3] Lactol spirits are aliphatic hydrocarbons boiling between 93° and 107° C.

The same polypropylene powder as used in Example 1 was added to the Rota-Cone in a ratio of 75 parts by weight of powder to 100 parts by weight of the foregoing liquid dispersion.

The resulting polypropylene-black pigment concentrate of Example 2 containing about 24 weight percent pigment was let down with the same base resin of Example 1 to a final concentration of 2 weight percent concentrate. The let down resin of Example 2 was subjected to the same extruder screen test as described under Example 1. The pressure rises for the let down resin of Example 2 were 9 percent and 17 percent for 4 pounds and 7 pounds extruded, respectively.

EXAMPLE 3

The same general procedure used in Example 1 was followed in Example 3 to prepare a polypropylene-yellow pigment concentrate except that the liquid dispersion was prepared in a pebble mill in place of a sand mill and screened through a 325 mesh screen. The dispersion had the following composition:

| Components: | Parts by weight |
|---|---|
| Cadmium sulfide | 50.0 |
| Aerosol OT | 1.6 |
| Mineral spirits | 30.0 |
| Toluene | 4.8 |
| | 86.4 |

The same polypropylene powder as used in Example 1 was added to the Rota-Cone in a ratio of 56 parts by weight of the powder to 100 parts by weight of the foregoing dispersion.

The 2 weight percent let down resin of Example 3 and a similar let down resin prepared from a commercially available polypropylene-yellow pigment concentrate, i.e., Control B, were subjected to the same extruder screen test as described under Example 1. The results are given in Table II.

TABLE II

| | Percent pressure rise | |
|---|---|---|
| | After 4 Lbs. | After 7 Lbs. |
| Example 3 | 7 | 15 |
| Control B | 50 | 100 |

EXAMPLE 4

The same general procedure used in Example 1 was followed in Example 4 except that an organic pigment was used in place of the inorganic pigment of Example 1. The liquid dispersion had the following composition:

| Components: | Parts by weight |
|---|---|
| Phthalocyanine Green ("GT–751–D" sold by Du Pont) | 20.0 |
| Aerosol OT | 1.6 |
| Mineral spirits | 73.6 |
| Toluene | 4.8 |
| | 100.0 |

The same polypropylene powder as used in Example 1 was added to the Rota-Cone in a ratio of 60 parts by weight of powder to 100 parts by weight of the foregoing liquid dispersion. The same extruder screen test as described in Example 1 was run on the 2 weight percent let down resin of Example 4 and resulted in a pressure rise of 26 percent and 60 percent for the 4 pounds and 7 pounds extruded, respectively.

Example 4 illustrates that even with the organic pigments which are recognized to be very difficult to disperse in polymer, the let down resin prepared with the concentrate from the process of the present invention results in a significantly lower pressure rise than that of the prior art process.

EXAMPLE 5

This example illustrates dispersing 3 different pigments in a polyethylene matrix to arrive at a pigment composite. The same general procedure used in Example 1 was also followed in Example 5 to prepare a polyethylene-light green pigment concentrate. The liquid dispersion had the following composition:

| Components: | Parts by weight |
|---|---|
| $TiO_2$ | 32.1 |
| Phthalocyanine Green ("GT–751–D" sold by by Du Pont | 9.9 |
| Benzidine yellow) ("YT–564–D" sold by Du Pont) | 7.7 |
| Aerosol OT | 1.0 |
| Mineral spirits | 20.0 |
| Lactol spirits | 32.2 |
| Toluene | 3.0 |
| | 105.9 |

A pulverized polyethylene was employed in a ratio of 50 parts by weight of polyethylene to 100 parts by weight of the foregoing liquid dispersion. The polyethylene used in this example is a commercially available resin sold under the trademark "DYOD" by Union Carbide Corporation having a nominal melt flow rate of about 14 gms./10 minutes. The size distribution on the pulverized resin was similar to that of the polypropylene used in Example 1.

The finished polyethylene-light green pigment concentrate containing about 50 weight percent pigment was let down with a commercially available polyethylene resin sold under the trademark "DYNK" by Union Carbide Corporation having a melt flow rate of about 2–4 gms./10 minutes and a density of 0.917 to 0.923. The resulting 2 weight percent let down resin of Example 5 was subjected to a modified version of the screen test as described under Example 1. In the modified screen test, the base polyethylene resin was fed through the same type of extruder as used in the test described under Example 1 at a constant rate of about 4½ lbs./hour and at a temperature in the range of about 425–475° F. The screen pack comprised a 60 mesh screen to remove large particles and other foreign matter, a 200 mesh screen to remove the agglomerates and another 60 mesh screen to lend support to the screen pack. The base resin pressure rise was recorded and then the let down resin was extruded. The percent pressure rise in this modified test equals $$\frac{\text{maximum pressure rise of let down resin} - \text{base resin pressure rise}}{\text{base resin pressure rise}} \times 100$$

The let down resin of Example 5 resulted in no measurable pressure rise after 7 pounds had been extruded.

In addition to the method of Example 5, other methods for preparing a composite of pigments include blending various pigment dispersions prepared in accordance with the methods of Examples 1–4 or by dry blending various finished polyolefin-pigment concentrates prepared in accordance with the process of this invention and then fluxing the dry blend in a 2-roll mill or other fluxing equipment.

As a control, the same 3 pigments of Example 5 were blended with the same pulverized polyethylene in the same ratio described under Example 5 in a 2-roll mill and banded out in the same manner as described under Example 1. The 2 weight percent let down resin of the latter concentrate, Control D as this resin is designated, registered a pressure rise of 275 percent after 7 pounds had been extruded.

The 2 weight percent let down resin of Example 5 was extruded as insulation onto copper wire. The coated wire was "blows" tested to determine the frequency of voids and other breaks in the insulation caused by gels and agglomerates in the insulation. The "blows" test comprises drawing the charged insulated wire through an electrically conducting bath, e.g., mercury, and recording the number of "blows" or short circuits when a void comes in contact with the bath. The wire coated with the let down resin of Example 5 registered only 1 blow in every 130,000 feet of insulated wire compared with 1 blow in every 40,000 feet for the wire coated with the Control D resin.

EXAMPLE 6

This example illustrates the use of water as a diluent in the preparation of the liquid dispersion. The following components were placed in the same Cowles dissolver as used in Example 1: 54.5 pounds of rutile $TiO_2$ sold under the trademark "R–101" by E. I. du Pont de Nemours and Company, Inc., 6 pounds of a non-ionic dispersing agent sold under the trademark "Igepal CO–630" by General Aniline and Film Corporation, 0.7 pound of an anionic dispersing agent sold under the trademark "Daxad 11 KLS" by Dewey and Almy Chemical Division of W. R. Grace & Company, 0.3 pound of a silicone defoamer sold under the trademark "581 B" by Colloid, Inc. and 38.5 pounds of water. The components were mixed at an agitator speed of 2200 r.p.m. for 45 minutes. The composition of the liquid dispersion which was passed once-through a Gaulin homogenizer manufactured by Manton-Gaulin Manufacturing Company comprised:

| Components: | Parts by weight |
|---|---|
| $TiO_2$ | 54.5 |
| Igepal CO–630 | 6.0 |
| Daxad 11 KLS | 0.7 |
| 581 B | 0.3 |
| Water | 38.5 |
| | 100.0 |

The agglomerates in the liquid dispersion were removed by means of a Vorti-Siv sieving and screening machine. The liquid dispersion had a grind of 7 on the Hegman scale.

The remaining steps of Example 6 to prepare a polypropylene-white pigment concentrate were the same as those used in Example 1 except that the ratio of polypropylene powder to liquid dispersion was 18.5 parts by weight to 34.5 parts by weight. The same polypropylene powder was used as described under Example 1.

The resulting 2 weight percent let down resin of Example 6 was subjected to the modified screen test as described under Example 5. The pressure rise for this example was 20% after 7 pounds had been extruded.

The results of the foregoing examples when compared with the controls prepared in accordance with prior art processes indicate the great improvement the process of this invention has over these prior art processes.

While only specific embodiments of the process of this invention have been illutrated by the enumerated examples, many modifications can be made to this process without departing from the spirit of the invention. All such modifications that fall within the scope of the appended claims are intended to be embraced thereby.

What is claimed is:

1. A process for incorporating additives into a thermoplastic resin matrix which comprises:
   (a) preparing a liquid dispersion of pigment or filler additives in a liquid diluent selected from the group consisting of water, aliphatic hydrocarbons having 1 to about 8 carbon atoms, mineral spirits, petroleum ether, kerosene, acetone, methyl ethyl ketone, methyl propyl ketone, methyl isopropyl ketone, methyl isobutyl ketone, acetate esters having 4 to about 8 carbon atoms, alcohols having 1 to about 8 carbon atoms, benzene, xylenes, toluene, ethylbenzene, trichloroethylene, tetrachloroethylene and blends of these diluents with a surface active agent,
   (b) removing the agglomerates having a size greater than about 40 microns from said liquid dispersion,
   (c) combining a powdered thermoplastic resin having an average particle size in the range of about 20 to 200 mesh with said liquid dispersion by spraying with continuous agitation in a mixing zone to uniformly disperse the liquid dispersion over the surface said liquid dispersion onto said thermoplastic resin of the thermoplastic resin without an accumulation of excessive liquid on the surface and to maintain the thermoplastic resin free-flowing, (d) continuously agitating the resulting mixture from step (c) for a period of at least fifteen minutes after the liquid dispersion has been sprayed onto the thermoplastic resin, (e) drying the resulting mixture from step (d) with continuous agitation, (f) removing the majority of the volatile liquids from said mixture during step (e), (g) subjecting the resulting dried additive-coated thermoplastic resin to a high shear step, and (h) recovering from step (g) a thermoplastic resin-additive composition.

2. The process of claim 1 wherein the dried additive-coated thermoplastic resin in step (f) is milled into a continuous sheet and reduced into discrete particles.

3. The process of claim 1 wherein the dried additive-coated thermoplastic resin from step (f) is extruded and cut into pellets.

4. The process of claim 1 wherein said additive are pigment additives.

5. A process for incorporating additives into a thermoplastic resin matrix which comprises:

(a) preparing a liquid dispersion of pigment additives in a liquid diluent selected from the group consisting of water, aliphatic hydrocarbons having 1 to about 8 carbon atoms, mineral spirits, petroleum ether, kerosene, acetone, methyl ethyl ketone, methyl propyl ketone, methyl isopropyl ketone, methyl isobutyl ketone, acetate esters having 4 to about 8 carbon atoms, alcohols having 1 to about 8 carbon atoms, benzene, xylenes, toluene, ethylbenzene, trichloroethylene, tetrachloroethylene an blends of these diluents with a surface active agent, (b) removing the agglomerates having a size greater than about 40 microns from said liquid dispersion, (c) combining a powdered thermoplastic resin having an average particle size in the range of about 20 to 200 mesh with said liquid dispersion by spraying said liquid dispersion onto said thermoplastic resin with continuous agitation in a mixing zone to uniformly disperse the liquid dispersion over the surface of the thermoplastic resin without an accumulation of excessive liquid on the surface and to maintain the thermoplastic resin free-flowing, (d) continuosly agitating the resulting mixture from step (c) for a period of at least fifteen minutes after the liquid dispersion has been sprayed onto the thermoplastic resin, (e) heating the resulting mixture from step (d) with continuous agitation in said mixing zone to an elevated temperature at a reduced pressure, (f) recovering the resulting dried pigment-coated thermoplastic resin containing no more than about 1 weight percent volatiles, (g) subjecting said dried pigment-coated thermoplastic resin to a high shear step, (h) reducing the size of the resin from step (g) into discrete particles, and (i) recovering from step (h) the particles of a thermoplastic resin-additive concentrate containing about 20 to 75 weight percent pigment additives uniformly dispersed through the resin matrix.

References Cited

UNITED STATES PATENTS

| 2,718,471 | 9/1955 | Samler | 106—181 |
| 2,512,459 | 6/1950 | Hamilton | 260—28.5 |
| 2,649,382 | 8/1953 | Vesce | 106—193 |
| 3,011,904 | 12/1961 | Ballentine et al. | 117—16 |
| 3,360,497 | 12/1967 | Jones et al. | 260—41 |

FOREIGN PATENTS

| 655,810 | 1/1963 | Canada | 260—41 |

MORRIS LIEBMAN, Primary Examiner

R. ZAITLEN, Assistant Examiner

U.S. Cl. X.R.

260—37, 41

PO-1050
(5/69)

UNITED STATES PATENT OFFICE
CERTIFICATE OF CORRECTION

Patent No. 3,637,571　　　　　　　　Dated January 25, 1972

Inventor(s) WALTER POLOVINA

It is certified that error appears in the above-identified patent and that said Letters Patent are hereby corrected as shown below:

(73)　Assignee should appear as follows:

DART INDUSTRIES INC.
　　　Los Angeles, California

Signed and sealed this 2nd day of May 1972.

(SEAL)
Attest:

EDWARD M. FLETCHER, JR.　　　　　ROBERT GOTTSCHALK
Attesting Officer　　　　　　　　　Commissioner of Patents

UNITED STATES PATENT OFFICE
CERTIFICATE OF CORRECTION

Patent No. 3,637,571      Dated January 25, 1972

Inventor(s) Walter Polovina

It is certified that error appears in the above-identified patent and that said Letters Patent are hereby corrected as shown below:

Column 10, after line 73, insert -- said liquid dispersion onto said thermoplastic resin --. Column 11, line 1, cancel "said liquid dispersion onto said thermoplastic resin".

Signed and sealed this 18th day of July 1972.

(SEAL)
Attest:

EDWARD M. FLETCHER, JR.
Attesting Officer

ROBERT GOTTSCHALK
Commissioner of Patents